United States Patent [19]

Garland

[11] Patent Number: 4,883,249

[45] Date of Patent: Nov. 28, 1989

[54] COUNTERBALANCING

[76] Inventor: Thomas A. Garland, 76 Reservoir Cir., Jamestown, R.I. 02835

[21] Appl. No.: 10,725

[22] Filed: Feb. 4, 1987

[51] Int. Cl.⁴ .................................................. F16M 13/00
[52] U.S. Cl. ...................................... 248/566; 108/37; 108/136; 248/162.1; 248/297.1; 248/575; 248/588; 248/595; 248/602; 267/73; 901/48
[58] Field of Search ............... 248/566, 567, 575, 576, 248/584, 586, 588, 585, 591, 595, 123.1, 599, 602, 297.1, 280.1, 162.1, 421, 354.1, 364; 16/80; 901/48; 267/73, 74; 108/136, 37

[56] References Cited

U.S. PATENT DOCUMENTS

| | | | |
|---|---|---|---|
| 1,403,483 | 1/1922 | Brittell | 248/599 |
| 2,545,515 | 3/1951 | Gannett et al. | |
| 2,573,160 | 10/1951 | Norman | 16/80 X |
| 2,757,554 | 8/1956 | Niedhammer, Jr. et al. | 49/340 X |
| 3,096,059 | 7/1963 | Johnson | 108/146 X |
| 3,172,632 | 3/1965 | Borg | 248/584 X |
| 3,472,488 | 10/1969 | Naughton | 108/147 X |
| 3,572,828 | 3/1971 | Lehner | 248/567 X |
| 3,721,437 | 3/1973 | Skaricic | 248/566 X |
| 3,741,512 | 6/1973 | Olsson | 248/585 |
| 4,156,391 | 5/1979 | Ubezio | 248/599 x |
| 4,449,262 | 5/1984 | Jahsman et al. | 248/421 X |
| 4,589,621 | 5/1986 | Hunt et al. | 248/586 |

OTHER PUBLICATIONS

"Grinnell Pipe Hangers", Grinnell Coporation, Exetee, NH, Catalog PH87, p. 111-113.

Primary Examiner—A. Chin Shue
Assistant Examiner—David L. Talbott
Attorney, Agent, or Firm—Fish & Richardson

[57] ABSTRACT

A counterbalancing mechanism allows a weight or constant force to be counterbalanced for any practical linear range of travel, including means for effortlessly adjusting the mechanism for a constant force or load of any practical magnitude. A load support slides along an axis substantially passing through a fixed lower pivot point. The load support member is pivotally connected to the top end of an upper lever arm. The upper lever arm is pivotally connected by a horizontal link to the upper end of a lower lever arm that is pivotally connected to the fixed point. A pully that may swivel about its swivel axis embraces the axis and guides a cable connected to the horizontal link at one end to a spring assembly at the other end. The spring assembly may be adjusted.

19 Claims, 11 Drawing Sheets

COUNTERBALANCING

The present invention relates in general to counterbalancing and more particularly concerns novel apparatus and techniques for counterbalancing a load so that it may assume any one of a number of positions over a relatively wide range and change to any other by the application of essentially zero force. The invention is embodied in mechanical devices that are reliable, relatively free from complexity and relatively easy and inexpensive to manufacture. The counterbalancing force may be easily adjusted by the user on-site, and may be adjusted to free float so that a negligible force may alter the position of the counterbalanced load.

A search of subclass 62 in class 5, subclasses 144 and 147 in class 108, subclasses 162.1, 188.5, 421, 585, 586, 589, 595 and 19 of class 248, subclasses 98 and 122 of class 254 and subclasses 347 and 348 of class 297 uncovered U.S. Pat. Nos. 2,757,554, 3,096,059, 3,472,488 and 4,449,262.

It is an important object of this invention to provide improved counterbalancing apparatus and techniques.

According to the invention, there are first and second lever arm means for pivotal connection at each end. The first, often top, end of the first lever arm means is pivotally connected to a load to be counterbalanced. The second, often lower, end of the second lever arm means is pivotally connected to a stationary point substantially along an axis along which the first end of the first lever means may translate. When viewed from an angle normal to the plane described by the movement of both ends of the first lever arm, said stationary point is in line with the axis of travel of the first, often top, end of the first lever arm means. There is means for restricting movement of the first lever means first end along substantially the axis, often vertical, passing through the second end of the second lever arm means. The second, often lower, end of the first lever means is pivotally connected to the first, often upper, end of the second lever means. There is counterbalancing means for providing a counterbalancing force to a load at the first lever means first end through the interconnected first and second lever means. Preferably, there is spring means for providing counterbalancing forces to a point along the axis of the second lever means.

Stated in other words, the counterbalancing apparatus comprises a source of a force source providing a force W to be counterbalanced movable along a first axis. The force source may be a weight W. There is means for supporting the force source providing the force W to be counterbalanced and movable along the first axis. There is at least one first lever means for pivotal connection to the means for supporting at a first end of the first lever means. This first lever means may be an upper lever means for pivotal connection to the means for supporting at the upper end of the upper lever means. There is at least one second lever means for pivotal connection at a first end of the second lever means to an intermediate pivot point and pivotally connected at a second point of the second lever means to a second point of the first lever means. The second lever means may be a lower lever means for pivotal connection at its lower end to the intermediate pivot point and pivotally connected at the upper end of the lower lever means to the lower end of the upper lever means. There is spring means for providing a counterbalancing force, and means for coupling the spring means to an inside pivotal connection such that a force from the spring means lies along a second axis through the second lever means in a direction intersecting the first axis. The spring rate $R_T$ of the spring means, the force W and the distance L between the inside pivotal connection and the second lever means first end, which may be the lower lever means lower end, are related by the equation $R_T = 2W/L$, whereby the counterbalancing apparatus comprises a self-contained counterbalance mechanism, that neglecting minimal effects of friction, manufacturing inaccuracies and strains, substantially exactly counterbalances the force W over the linear range of travel of the force source along the first axis.

Numerous other features, objects and advantages of the invention will become apparent from the following specification when read in connection with the accompanying drawing in which.

Figure 1:
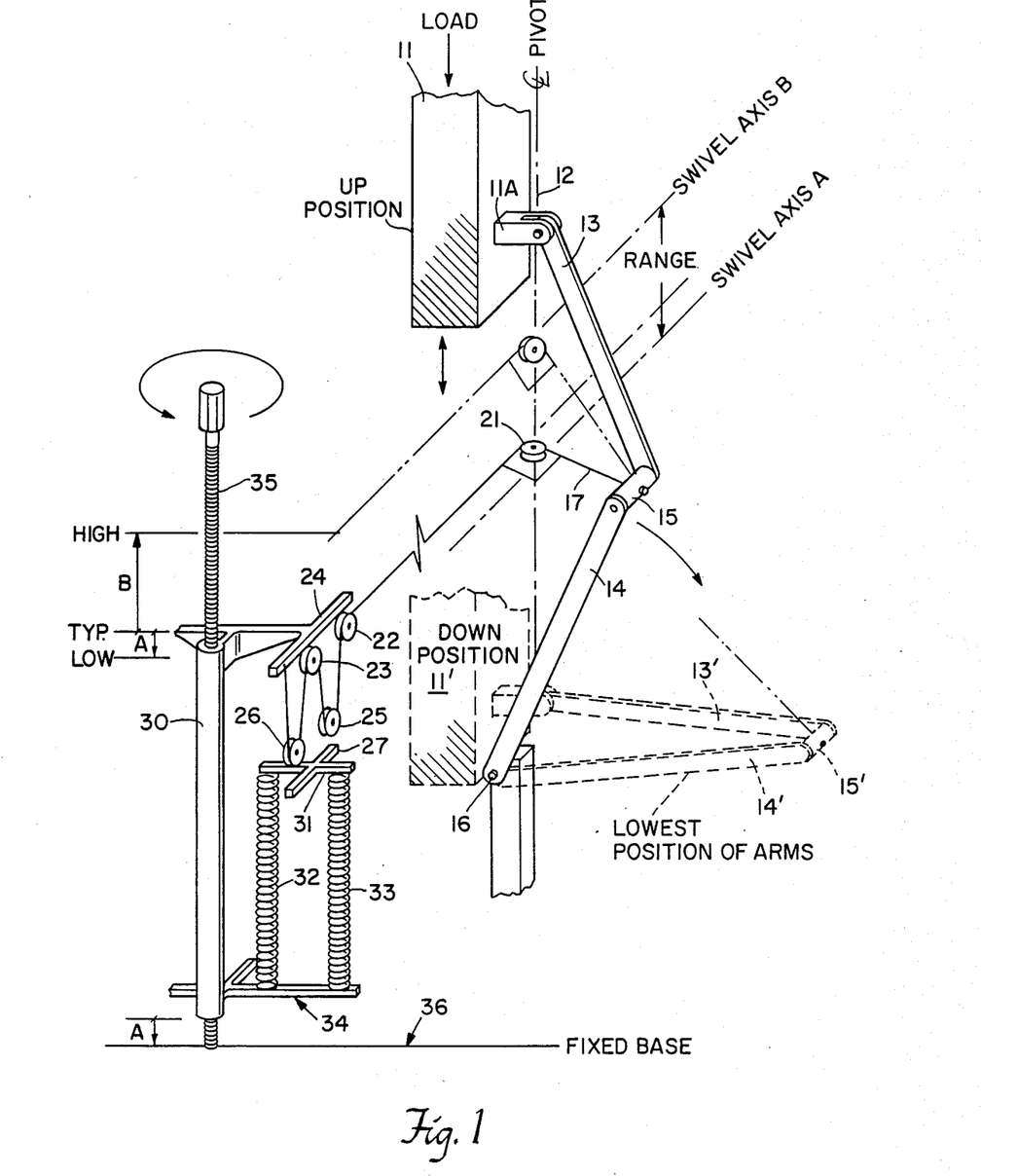
FIG. 1 is a perspective pictorial representation of an exemplary embodiment of the invention.

With reference now to the drawing, and more particularly FIG. 1 thereof, there is shown a perspective pictorial representation showing the right-hand side of an exemplary embodiment of the invention in a form usable for counterbalancing a drafting table, for example. The load 11 is applied to a member or tube pivotally connected to the first, often upper, end of lever arm 13. The second, often lower, end of lever arm 13 is pivotally connected to the often upper end of lever arm 14 through a horizontal link 15. The often lower end of lever arm 14 is pivotally connected to a fixed point 16.

One end of a cable 17 is connected to link 15 and passes around a translatable pulley 21. To adjust the available counterbalancing force according to the invention, pulley 21 may be adjusted vertically, up or down, essentially along an axis between upper pivot 12 and lower pivot 16. At all times the angle between contiguous portions of cable 17 extending from pulley 21 is substantially 90°. On activating the counterbalancing mechanism, pulley 21 stays in its adjusted position, but may swing through a range of angles substantially between 0° and 90° about the pulley swivel axis. Cable 17 passes over a pair of upper pulleys 22 and 23 carried by bracket 24 and lower pulleys 25 and 26 connected to a floating link 27 connected to the top of left and right springs 32 and 33, respectively. Springs 32 and 33 are secured at their lower ends to bracket 34 interconnected by threaded sleeve 30 to upper bracket 24. Threaded sleeve 30 rides on lead screw 35 rotatably supported in fixed base 36. Rotation of screw 35 so as to move pulley 21 swivel axis above or below a height equal to the length between pivot hole centers of lower arm 14 above center of fixed point 16 extends springs, such as 32, 33, to increase tension in cable 17 (also in left-hand cable not shown on drawing). In a specific example there are five springs, such as 32, 33, one on the centerline and two on each side.

The position of the lever arms and load when the load is in a down position is represented in broken lines and identified by reference numerals 11', 13', 14' and 15', respectively.

By choosing the proper relationship among spring rate $R_T$, the swivel axis height L of pulley 21 above the fixed end 16 of lower arm 14 and the weight to be counterbalanced W, according to the equation $R_T = 2W/L$, the invention provides a self-contained counterbalance mechanism that, neglecting minimal effects of friction, manufacturing inaccuracies and strains, substantially exactly counterbalances a given weight over any linear range of travel. The weight to be counterbalanced may be changed, and by adjusting screw 35 the invention may be correspondingly adjusted to counterbalance the new weight.

The invention may counterbalance over virtually an infinite range of travel and load limited only by practical considerations, such as mechanism size, manufacturing considerations and stress levels.

The invention requires no external power source or electrical components and may be counterbalanced by using any number of readily available spring types. Change of height L to counterbalance loads W of various magnitudes may be accomplished by applying small external adjustment forces or alternately the mechanism may be configured to allow a secondary mechanism to provide adjustment forces thereby allowing effortless adjustment of counterbalancing force while load W is removed. The spring rate $R_T$ is preferably a linear spring rate. The pulley system shown may be employed to gain more linear travel for a given spring. Thus, $R_{sp} = (ME)^2 R_{LE}$, where $R_{sp}$ equals required rate of spring(s), (M.E.) = mechanical advantage from pulleys, $R_{LE}$ corresponds to $R_T$ in the equation relating spring rate, weight and swivel axis height. The notation $R_{LE}$ at line end is used for clarity in a specific system such as that shown in FIG. 1 where cable or line is used to deliver spring force to lever arms. In a more generalized model $R_T$ is used to describe the total spring rate delivered to all levers and linkages.

$R_{sp}$ is the total effective cumulative rate for all springs being used, such as springs 32 and 33 in FIG. 1 and three others. $R_{LE}$ is the total effective cumulative spring rate delivered to the line(s) end(s) (LE), after the mechanical advantage of the pulley system. This spring rate, $R_{LE}$, is the spring rate effectively "felt" if both sides of the counterbalancing mechanism were configured so that both lines could be pulled by one hand at one time. Thus, if $R_{LE} = 120$ lb/in., then the spring rate "felt" by one side only = 60 lb/in.

The invention has a wide variety of applications, including supporting tables, chairs, equipment, metal beds and other devices desired to be positioned at adjustable heights, as a jack, as a log splitter, in exercising equipment and in any other application requiring a force over a range of travel and the ability to vary the force. For example, a counterbalanced seat according to the invention adjusted to counterbalance the weight of a user may rise when the user departs and return to the preferred sitting height upon return of the user.

Figure 2:
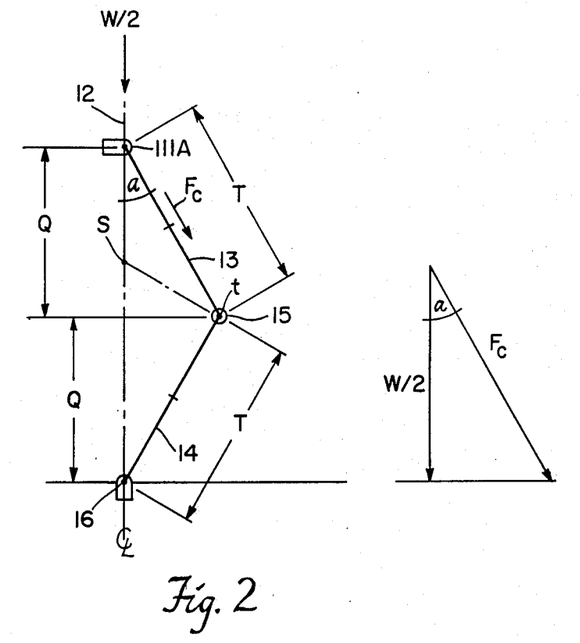
FIGS. 2 and 3 are diagrams illustrating the principles of the invention.

Referring to FIG. 2, there is shown a diagrammatic representation showing for clarity the right-hand side of a typically two-sided symmetrical system helpful in deriving certain relationships and understanding the principles of operation of the invention. It is convenient to analyze only the right-hand side [RHS]. If the length of lever arms 13 and 14 are equal and of length T and the acute angle between arm 13 and a vertical axis is "a" and half the total lifted weight W is carried by side 11A, the compensating force $F_c$ directed along arm 13 is related to weight W by the equation $F_c = W/(2 \cos a)$. Furthermore, if the height of link 15 above lower end 16 is Q, through trigonometric identities it can be shown that $Q = T(\cos a)$. If the moment arm for force $F_c$ about pivot 16 is $l_a$, it can be shown that $l_a = 2(Q)\sin a$ or $2(T \cos a)\sin a$. The moment $M_{w\text{-}RHS}$ caused by the weight W/2 about pivot 16 can be shown to be $WT \sin a$.

Figure 3:
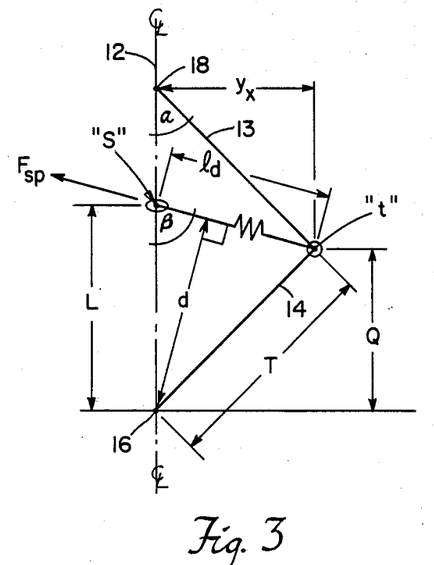

Referring to FIG. 3, there is shown a drawing similar to FIG. 2 but helpful in analyzing the effect of the counterbalancing spring. It is convenient to refer to the axis of link 15 as t, the location of pulley 21, or swivel axis, as s, $l_d$ as the spring extension from point s to point t and analyze only the right-hand side [RHS]. The spring force $F_{sp\text{-}RHS} = l_d R_{RHS}$ where $R_{RHS}$ is the spring rate of spring acting between points s & t and delivered to the RHS of mechanism at point t. The moment produced by the spring $M_r$ about point 16 is $M_{r\text{-}RHS} = F_{sp\text{-}RHS}(d)$, where d is the lever arm distance between the spring and point 16 and equals L sin b. b is the angle between the spring and the axis between lower pivot point 16 and upper pivot point 18. Sin $b=y_x/l_d$ where $y_x$ is the perpendicular distance between point t and vertical axis between points 16 and corresponding upper pivot point at "top" of arm 13. Sin $a=y_x/T$, therefore $y_x=T$ sin $a$.

Sin $b=y_x/l_d=(T\sin a)/l_d=d/L$. $d=L\sin b=L(T\sin a)/l_d$. $M_{r-RHS}=F_{sp}d=l_dR_{RHS}LT\sin a/l_d=R_{RHS}LT\sin a$. Constraining the summation of the moments to equal zero, $M_{w-RHS}=M_{r-RHS}$. $WT\sin a=R_{RHS}TL\sin a$. $W=R_{RHS}L$, or $R_{RHS}=W/L$ where $R_{RHS}$ is the spring rate available for one side exclusively, W is the full weight applied to the entire system; that is, twice what is actually applied to the right hand side, and Q is the adjustable height of point s. $R_t=$the spring rate for the counterbalance of the full weight is then $R_t=2W/L$. Therefore, for a given total spring rate $R_t$ and a changing W, L may be adjusted in proportion to any change in W.

For a practical system to counterbalance a range of weights, one may choose an expected average weight $W_{avg}$, setting L=T, the length of a lever arm when both are in line. Then $R_T=2W_{avg}/T$, and solve for $R_T$ for a given T. Having now established $R_T$, L may be varied within the constraints of the physical mechanism to change counterbalance force available.

As L goes to zero, a small weight may be counterbalanced with a large $R_T$; however, practical limitations, such as stress levels induced in the mechanism from a large spring often result in a practical minimum L=10–20% of T and a typical maximum L being of the order of 2T. Within the limits of material strengths, a large $R_T$ could counterbalance a proportionately large weight while also being adjustable to counterbalance a much smaller weight approaching nearly zero. Practical limitations are also affected by manufacturing considerations, tolerances, strains, friction and similar considerations.

As L gets very large, a small $R_T$ may be used to counterbalance a large weight and still counterbalance a weight approaching zero as L is reduced. Practical limitations are the available height to allow L to get very large and the requirement for substantial extensions in the spring as L becomes very large.

Neglecting friction, strains, manufacturing tolerances and similar characteristics, the invention provides an exact counterbalance as long as the spring rate $R_T$ is linear except that an initial tension may be satisfactory and useful in certain configurations as subsequently described. It is thus often preferred that a conventional extension spring be manufactured with attention to stress relief and removal of any initial tension. The spring should also preferably be operated within stress levels that do not deform the spring wire and exceed the elastic limit. The specific example of FIG. 1 shows conventional extension springs; however, any spring or elastic material configuration may be used, for example, a compression or torsion spring, gas or other fluid compression cylinders or tubes, characterized by a nearly linear load/deflection relationship. A torsion spring or reel-type power spring may be advantageous for allowing adjustment of L over a relatively long distance because this spring-type typically has a long working extension.

For the specific application of a drafting table, which may embody the structure of FIG. 1, springs that having a working extension of only about five inches may be used to accommodate a range of adjustments over about 20 inches by using a 4/1 pulley system so that a four-inch extension of cable 17 would require only an inch of spring extension.

When L=Q=T, angle a=0°, and the table is at full upper height. While this full upper height may not be practically achievable because of interference between pivot 15 and swivel pulley 21, the condition is approximated as the angle a gets small. At this position $l_d$ (the distance between points s and t) is 0, and no force is generated by zero spring extension $l_d$ because none is needed as arms 13 and 14 are vertical and $M_w=M_r=0$.

In order to move the swivel pulley axis s up or down so that L does not=T, cable 17 must be extended by deflecting the spring system. This movement will require a screw adjustment force, such as by moving screw 35, or actuation of the secondary "effortless" adjustment mechanism described below.

Figure 4:
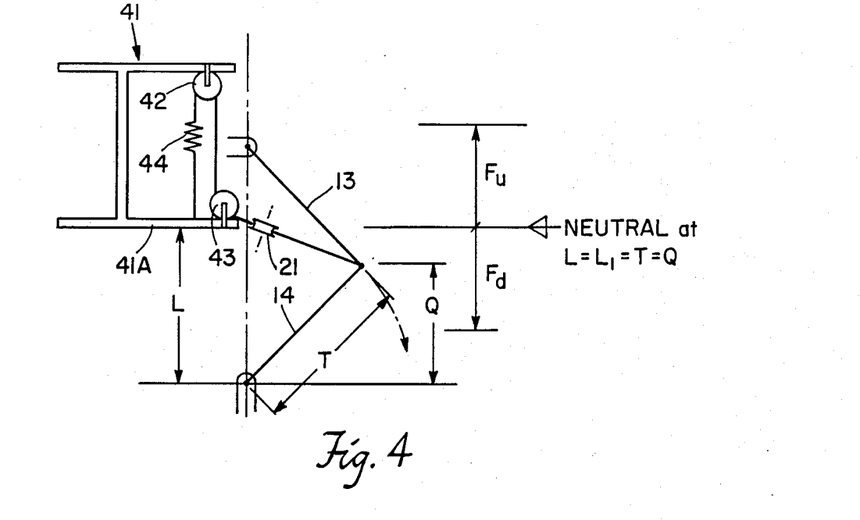
FIG. 4 is a diagram of a modification that allows effortless adjustment of the counterbalancing force.

According to another feature of the invention, a secondary mechanism may be provided to eliminate the requirement for an external applied force to change height L so as to counterbalance a new load W. Referring to FIG. 4, there is shown a diagrammatic representation of a simplified embodiment of the basic counterbalance according to the invention. To move bracket assembly 41 upward when angle a is approximately zero and the load is at the of its stroke requires an upward force to extend the spring from a neutral position where L=T. To move bracket assembly 41 downward from the neutral position where L=T, requires a downward force to extend spring 44. The neutral position is the theoretical position when a=0°, and the springs are not extended. This positioning can only happen if L=T. If L is not equal to T, then some line must be extended to allow the distance of $l_d$ to be other than zero when a=0°.

Figure 5A:
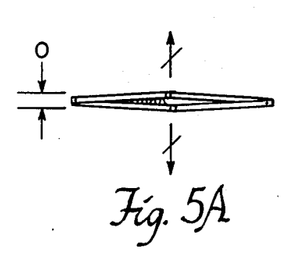
FIGS. 5A–5C are diagrammatic representations of secondary mechanisms for achieving zero adjusting force.
Figure 5B:
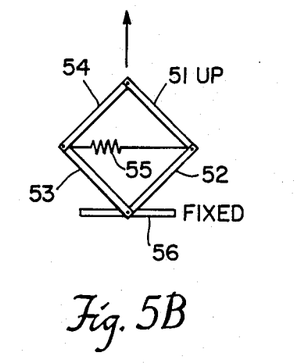
Figure 5C:
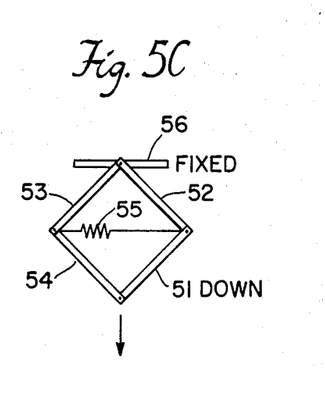

Referring to FIGS. 5A, 5B and 5C, there are shown diagrammatic representations of the secondary mechanism that applies no force, an upward force and a downward force, respectively. As best seen in FIGS. 5B and 5C, the secondary mechanism comprises four pivotally connected arms 51, 52, 53 and 54 with a horizontal spring 55 interconnecting the pivot points between arms 51 and 52 and 53 and 54. When the arms are fully collapsed as shown in FIG. 5A in the neutral position, there is neither a downward nor an upward force. When positioned as shown in FIG. 5B, the pivot point between arms 51 and 54 exerts an upward force. When positioned as shown in FIG. 5C, the pivot point between arms 51 and 54 exert a downward force. The pivot point between arms 52 and 53 is connected to fixed platform 56. The pivot point between arms 51 and 54 exerts the necessary force on the main counterbalance mechanism to allow for effortless adjustment of height L when angle a is approximately equal to zero. If $\theta$ is the angle between arm 51 and the vertical axis, y is the height of the pivot between arms 51 and 54 above the spring 55 axis, x is half the distance between the ends of spring 55, and the length of each of arms 51, 52, 53 and 54 is A, $y=A\cos\theta$ and $x=A\sin\theta$.

$F_{UP/DN}=$Force needed to move main mechanism up or down $=R_{LE}(L-T)=R_{LE}(2y)=R_{LE}(2A\cos\theta),=R_T(2A\cos\theta)$ recalling that $R_T=R_{LE}$, so force required from secondary mechanism is derived as follows: $F_x=$horizontal force acting on pivot points between arms 51 and 52 and arms 53 and 54 as a result of spring extension of 2x. Therefore $F_x=R_2 2x$ where $R_2$ is the rate of secondary spring 55.

Equating: $\tan \theta = \frac{\sin\theta}{\cos\theta} = \frac{F_x}{F_y} = \frac{R_2 2x}{F_y}$, where $F_y = 1/2$ total vertical force $(F_{yT})$ generated by secondary mechanism. It may be convenient to think of $F_y$ as the vertical component contributed by the RHS of secondary mechanism, so; $F_y = \frac{R_2 2[x] \cos \theta}{\sin \theta}$ and recalling $x = A \sin \theta$ $F_y = \frac{R_2 2[A \sin \theta] \cos \theta}{\sin \theta}$ $= 2R_2 A \cos \theta$ so; $F_{yT} = 4R_2 A \cos \theta$ equating force needed to force available;

$R_T 2A \cos \theta = 4R_2 A \cos \theta$ therefore:

$R_T = 2R_2$ or $R_2 = \frac{1}{2} R_T$ so, with configuration shown in the spring rate of secondary mechanism must be half that of total rate of primary mechanism.

This secondary mechanism thus provides exactly the force required to adjust the larger bracket and spring system and counterbalance. A practical consideration is that the width of the secondary mechanism be kept under the maximum available from the larger mechanism, usually 2L plus the separation off the center-line. For a typical drafting table this is approximately $2(12.895) + 8 \cong 34'$.

Note that, as with the primary counterbalance mechanism which requires some separation of left and right swivel pulleys to allow for installation of springs and for convenient pivotal attachments to the larger movable tube supporting the weight W to be counterbalanced, it is desirable to allow separation off the center line for housing the secondary spring system by adding horizontal links at the top and bottom of each parallelogram linkage pivotally connecting the tops and bottoms, respectively, of the left pair and right pair of links.

Figure 6:
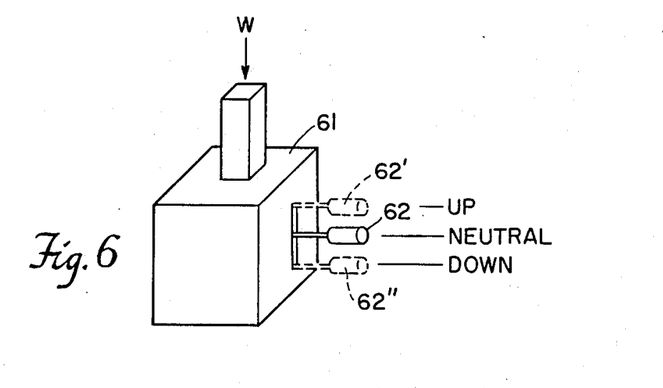
FIG. 6 is a perspective view of a housed system according to the invention.

Referring to FIG. 6 there is shown a perspective view of a housed system according to the invention containing both the primary and secondary mechanisms in housing 61 having an exposed handle 62. Handle 62 is moved upward to position 62' to increase the counterbalancing capacity and downward to position 62" to decrease the counterbalancing force.

Since essentially no force is required to move handle 62, virtually no work or energy is being imparted to the closed system inside housing 61 from external sources. By adjusting handle 62, the system does impart a variable force on the weight being supported. The internal potential energy of the system (and its ability to convert that energy by doing work on an outside body) is changed while requiring negligible external force to accomplish such change.

If the weight W being counterbalanced varies, then counterbalancing according to the invention requires a corresponding change in L or $R_T$, or both. $R_T$ may be changed in a number of ways, such as by reducing the number of working coils to increase $R_t$. This may be done by turning a threaded plug into the spring that allows for some adjustment of available counterbalance force.

Assemblies according to the invention may be cascaded. This cascading may allow increased vertical travel without larger transverse space requirements.

Figure 7:
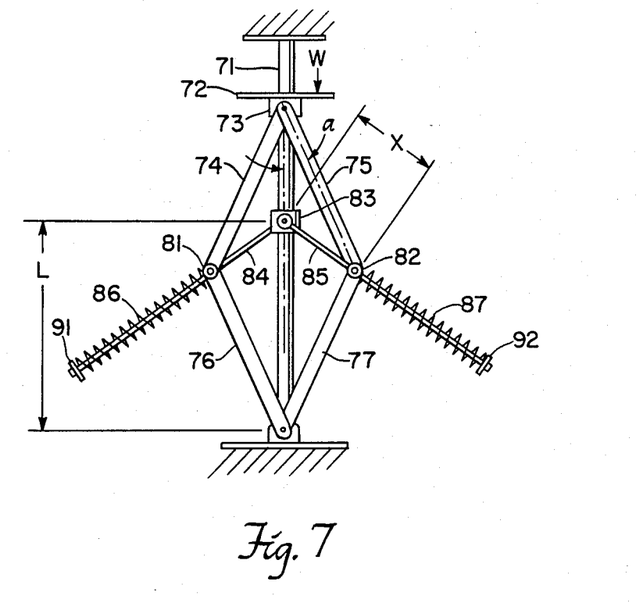
FIGS. 7 and 8 are diagrammatic representations of embodiments of the invention using parallelogram mechanisms and alternate spring configurations.

Referring to FIG. 7, there is shown another embodiment of the invention comprising a parallelogram linkage. This embodiment comprises a stationary pole 71 with weight supporting platform 72 coupled thereto by a linear bearing 73. Upper arms 74 and 75 are pivotally connected at there top ends to linear bearing 73. Lower arms 76 and 77 are pivotally connected to the bottom of pole 71 at their bottom ends and to linear bearings 81 and 82 at their top ends to which the lower ends of upper arms 74 and 75 are connected. Sliding collar 83 may be vertically adjusted along a second pole 71A offset from pole 71 but at all times centrally located between bearings 81 and 82 and on the centerline of the mechanism as viewed from the front as in FIG. 7 and is pivotally connected to spring support rods 84 and 85 which carry compression springs 86 and 87, respectively between collars 81 and 82, respectively, and end washers 91 and 92, respectively.

Figure 8:
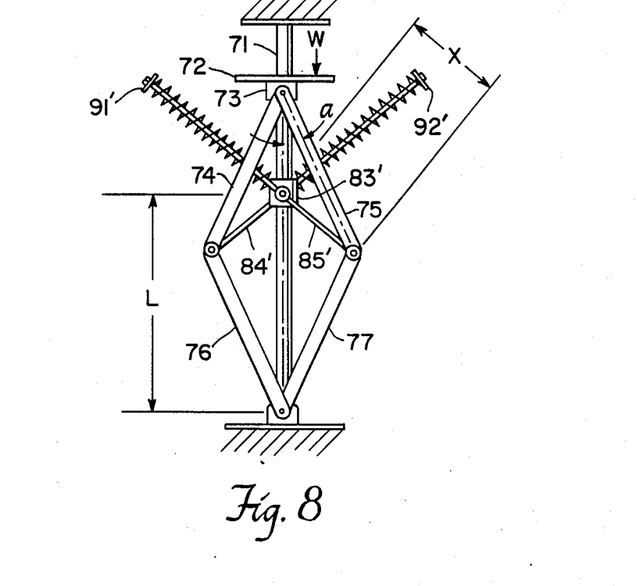

Referring to FIG. 8, there is shown a variation of the embodiment of FIG. 7 in which rods 84' and 85' are pivotally connected to the pivotal connection between arms 74 and 76 and between arms 75 and 77, respectively, at their lower end and are pivotally and slidably connected to collar 83' with springs 86' and 87' extending between collar 83' and end washers 91' and 92'.

Embodiments as shown in FIGS. 7 and 8 eliminate the need for a swivel pulley or transverse separation to house springs while maintaining height L independent of angle a and constant over the range of operation of the mechanism and are highly efficient with minimal mechanical losses due to simplified configurations and reduced member of components.

Figure 9:
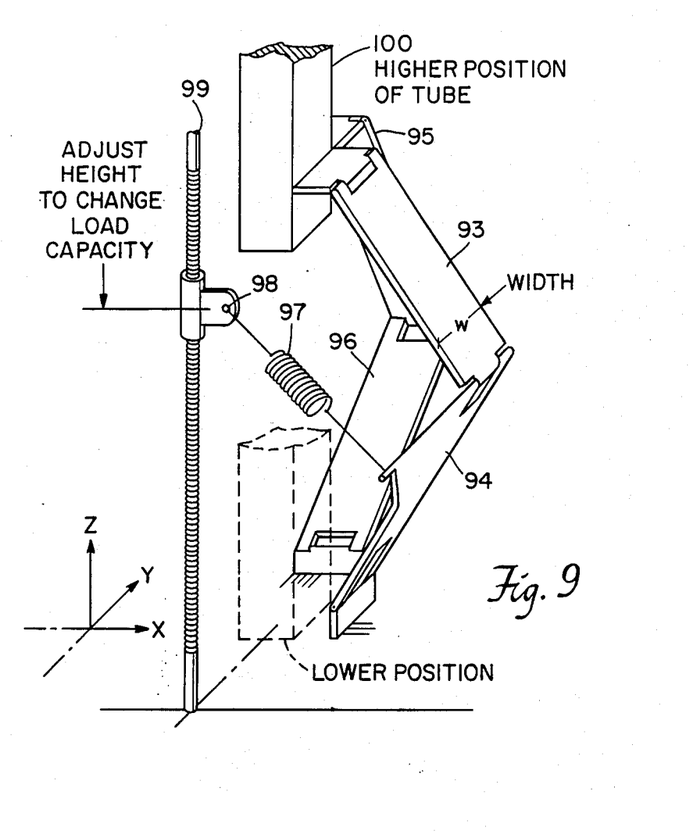
FIGS. 9 and 10 show perspective and top views, respectively, of a modification of the invention which allows the elimination of the bearing system.
Figure 10:
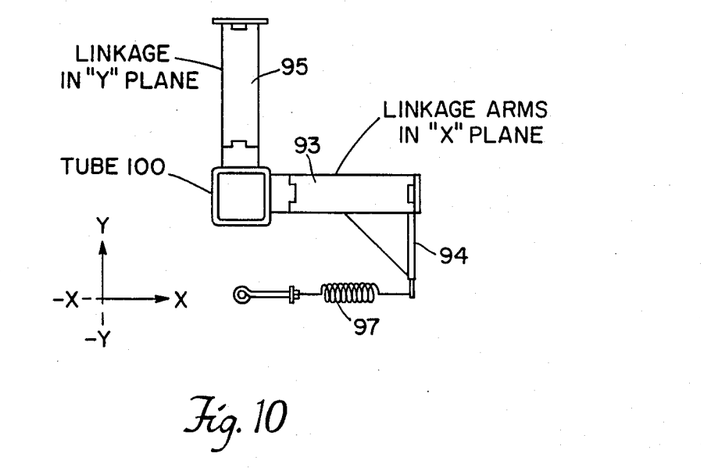

Referring to FIGS. 9 and 10, there are shown perspective and top views respectively of a modification of the invention which allows the elimination of a bearing system to guide the linear travel of the load bearing member 100 while incorporating such guidance into lever arm linkages similar to those described in FIGS. 2 and 3. The specific requirement to eliminate a dedicated bearing system to guide load bearing member 100 is that at least two pairs of lever arm linkages are connected to the load bearing member and support structure and that such linkage pairs operate in planes preferably normal to one another. (See 93, 94, 95, 96). Such orientation is readily achieved by attaching linkage pairs for operation in planes normal to respective adjacent faces of a square tube load bearing member. Insofar as linkage pairs operating in the x-z plane restrict movement of the load bearing member to the x-z plane and linkage pairs in the y-z plane restrict the load bearing member to the y-z plane significantly by resisting twist in individual linkage arms 93, 94, 95, 96, it is desirable to reduce stress levels in individual arms by maximizing width "w", and as practical to maximize the torsional stiffness of individual arms. Referring to FIG. 10 it can be seen that the configuration drawn could be readily expanded to include a third linkage pair operating in the $-xz$ plane so as to be opposite that shown in the $+xz$ plane (arms 93, 94) and thereby describing a symmetrical view which would lead itself to inclusion of another spring similar to 97 going to the joint between the linkage pair opposite to pair 93, 94.

Figure 11:
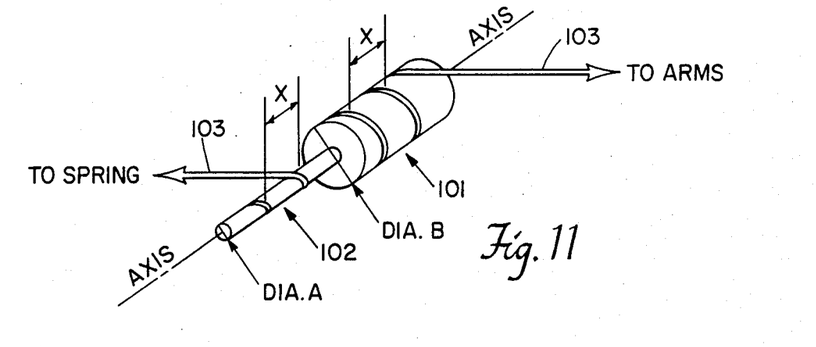
FIG. 11 shows a variation of the embodiment of FIGS. 7 and 8 with a preferred system for delivering mechanical advantage and large linear cable extension from smaller spring deflection.

Referring to FIG. 11, there is shown a perspective view of a stepped grooved shaft that allows the mechanical advantage of the pulley system or gears with less frictional losses. The spiral grooved shaft has a large diameter grooved portion 101 and a smaller diameter grooved portion 102. The cable 103 may be wrapped around the shaft residing in the grooves as shown. The distance along the axis and between lines may be kept constant. It may be advantageous to run the shaft in linear bearings to allow selection of the location of the lines.

Figure 12:
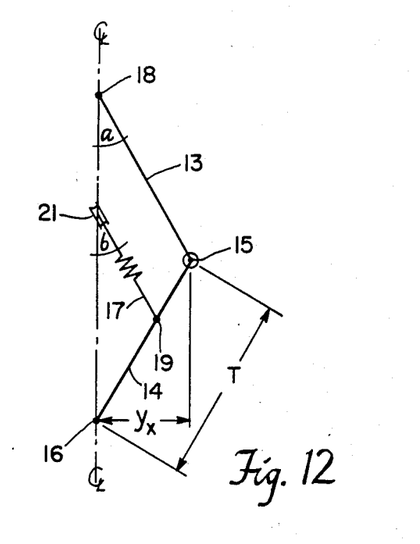
FIG. 12 is a simplified diagram of an embodiment of the invention in which the counterbalancing force is applied to, or to a point along an axis through, said second lever anywhere along the axis through the lower arm.

Referring to FIG. 12, there is shown a simplified diagram of a modification of the example in FIG. 3 illustrating how it is possible to apply a load or attach cable 17 anywhere along lever arm 14, not just at link 15. By applying the spring force to a point 19 closer to lower pivot 16, there is a correspondingly shorter extension of cable 17, thereby requiring a smaller working deflection in the spring and facilitating elimination of the systems of mechanical advantage described above to increase the effective available cable extension, such as the pulley arrangement for providing a cable extension four times the increment of spring extension.

T = Length of lever arms 13, 14
c = Dist. along 14 from pivot 16 to attachment of cable As in FIG. 3, and considering the RHS of mechanism, it can be shown that:

$$M_{r-RHS} = \frac{c}{T} R_{RHS} LT \sin a = cR_{RHS} L \sin a$$

Note that $M_w$ (due to wt. applied) has not changed. See FIG. 2.

$$M_{w-RHS} = WT \sin a$$

$$M_{w-RHS} = M_{r-RHS}$$

$$WT \sin a = cLR_{RHS} \sin a$$

$$R_{RHS} = \frac{WT}{cl} = \frac{W}{L}\left(\frac{T}{c}\right)$$

As before $R_T$ = total effective spring rate available to all arms = $2R_{RHS}$ $$R_T = \left(2\frac{W}{L}\right)\left(\frac{T}{c}\right)$$

Figure 13:
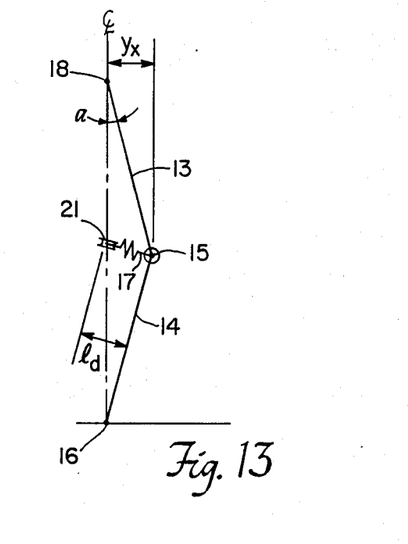
FIG. 13 is a diagrammatic representation of links at a minimum angle as dictated by practical considerations.

Referring to FIG. 13, there is shown a diagrammatic representation of links in the counterbalancing structure at a typical minimum angle a dictated by practical consideration. As the angle a gets small, practical mechanical and manufacturing constraints usually prevent a from becoming 0° therefore requiring some extension of the spring system at the highest possible mechanism height. The distance $y_x$ between link 15 and the axis between lower and upper pivots 16 and 18 respectively is the result of angle a being nonzero and establishing distance ld, the spring extension distance between swivel axis s and pivot point t. Since in the theoretical model angle a may assume any value between 0° and 360° and multiples thereof, there is an associated spring force at all non-zero angles a. The initial small extension $l_d$ when a is small, results in the appropriate spring force to achieve mechanism equilibrium if the spring mechanism is configured so that if L=T, and a=0°, there would be no spring extension.

Figure 14:
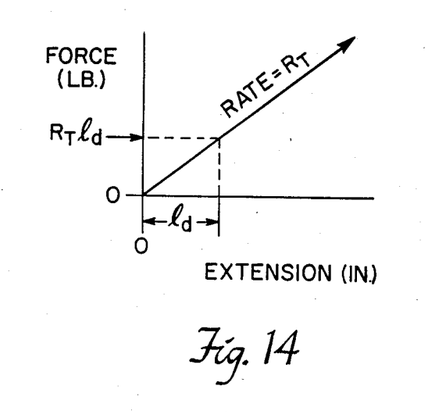
FIG. 14 is a graphical representation of the relationship between force and extension for an option with no initial tension in the spring.

As a practical matter, recognizing manufacturing considerations and departures from the model caused by friction and other factors, a practical minimum angle a might be 15°. The spring force then necessary along a distance $l_d$ could then be provided by the extension of a spring mechanism by that distance or by using a spring with initial tension equal to $R_T l_d$ and rate of $R_T$. Referring to FIG. 14, there is shown a graphical representation of the relationship between force and extension for the option of having the distance $l_d$ cause a similar extension of the spring mechanism of rate $R_T$ with no initial tension in the spring.

Figure 15:
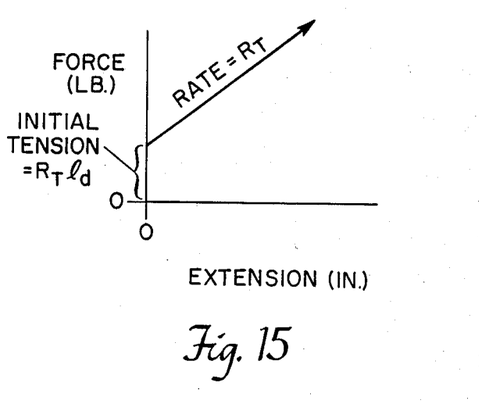
FIG. 15 a graphical representation of the relationship between force and extension using a spring with initial tension.

Referring to FIG. 15, there is shown a graphical representation of the relationship between force and extension in which the distance $l_d$ causes no extension of the spring mechanism, but any further extension causes an extension of the spring with initial tension = $R_T l_d$ and rate $R_T$.

Figure 16:
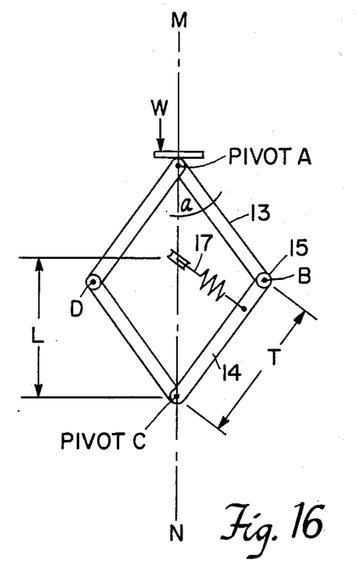
FIG. 16 is a diagrammatic representation of a system having fixed and movable pivots on a predetermined axis allowing rotation of first and second levers about their respective pivot points substantially on the axis of load translation.
Figure 17:
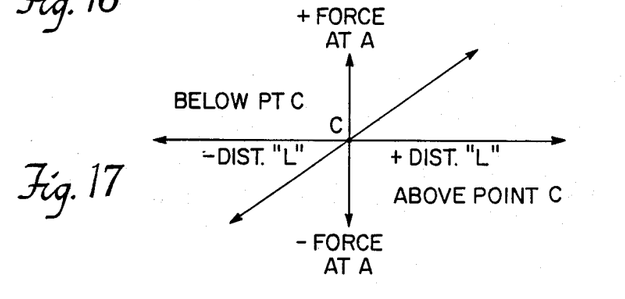
FIG. 17 is a graphical representation of force as a function of height for the system of FIG. 16, and FIGS. 18 and 19 are diagrammatic representations of mechanisms helpful in understanding advantages available from cascading.

The relationships derived above are valid for any angle a between 0° and 360°, except instantaneously at 90° and multiples thereof, thereby exactly describing a transformation of linear to rotary motion. As the angle a swings through successive 360° increments, link 15 or any fixed point on lower arm 13 or on upper arm 14, describes a circle. A weight W can be caused to reciprocate linearly over a stroke of distance 4T. Alternatively, angle a may be constrained to be between 0° and 180° while achieving a stroke of 4T. Referring to FIG. 16, there is shown a diagrammatic representation of a general system having a pivot C fixed on axis MN, a pivot A constrained to move along axis MN, an angle a between link AB 13 and axis M-N that may assume any angle between 0° and 360 degrees and any multiple thereof and a length c along the lower arm BC 14 and/or CD where cable 17 from swivel 21 joins the arm, c being any distance between 0 and T, the length of an arm. The lower arm BC can be extended past pivots B and C, and the cable 17 can join this arm anywhere along a line passing through points B and C. Length T can be any practical length or the mechanism can be cascaded to reduce T. Height L can be anywhere along axis MN. Above pivot C, it produces an upward force at pivot A; below pivot C, it produces a downward force at pivot A. Referring to FIG. 17, there is shown a graphical representation of force as a function of this distance L.

Figure 18:
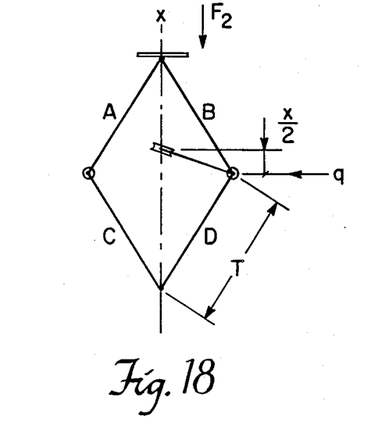
Figure 19:
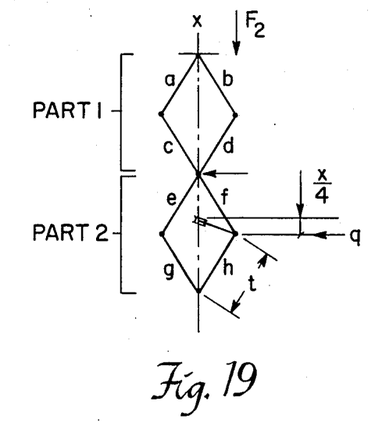

Referring to FIGS. 18 and 19, there are shown diagrammatic representations of mechanisms helpful in understanding advantages available from cascading parallelogram mechanisms to allow efficient use of space and less extension of cable or spring. This arrangement has advantages similar to those of the embodiment of FIG. 12. FIG. 18 shows a single part system having arms A, B, C and D each of length T and the swivel axis s of pulley 21 x/2 above the pivot joining arms B and D for a displacement x of the pivot point connecting arms A and B.

Referring to FIG. 19, the two part system has a pair of crossed rigid arms c-f and d-e pivoting at point z. It is convenient to assume that the length of each arm t=T/the number of parts, in the example of FIG. 19, for two comparable mechanisms having equal maximum height. Using the principle of work equivalents, for a given load or force $F_2$ to be applied at the top and counterbalanced, by the two-part mechanism of FIG. 19, a force $F_1 = 2F_2$ must be available at point z.

$$F_2(x) = F_1\left(\frac{x}{2}\right); F_1 = 2F_2$$

Also, the cable extension is a function of movement at point q in FIG. 18 which in the two-part system is one half of that in the single system. For the single system $R_T = 2W/L$. For the multiple-part system $$R_T = N^2 \frac{2W}{L}$$

where N is the number of parts, with a part being considered as a four-sided parallelogram linkage.

It has been shown that the moment produced about pivot C (also called point 16) by linkage and spring orientations and characteristics described is a function of, and varies with, the sin of angle a. When utilized as a counterbalance, the, moment produced by a constant weight or force W about point C has also been shown to vary with the sin of angle a, thereby allowing an exact counterbalance over any angle a with counter-balancing a force or weight W controlled by length L and rate $R_T$ as previously described.

With linear motion typically described by a stroke of up to 4T and with the ability to constrain angle a to oscillate between 0° and 180° or 0° and 360° and increments or multiples thereof, with a constant force over a linear range of travel that may be adjusted in both magnitude and sign or direction, with rotary motion described by components of the mechanism, and with sinusoidally varying moments produced, it will be obvious to one skilled in the art that there are any number of variations of the mechanism as described herein that can be configured to produce various useful effects particularly when linear and rotary motions and constant and sinusoidally varying forces, moments, signals, or characteristics are involved.

Figure 20A:
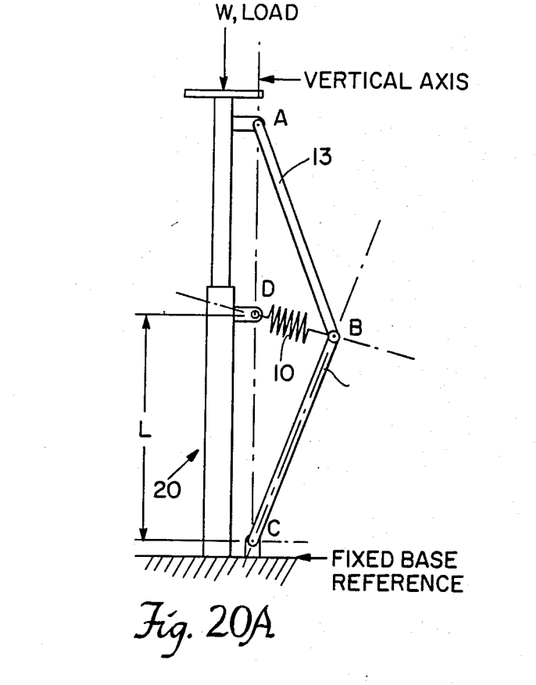
FIGS. 20A and 20B are diagrammatic representations of a basic form of the invention having three moving parts.
Figure 20B:
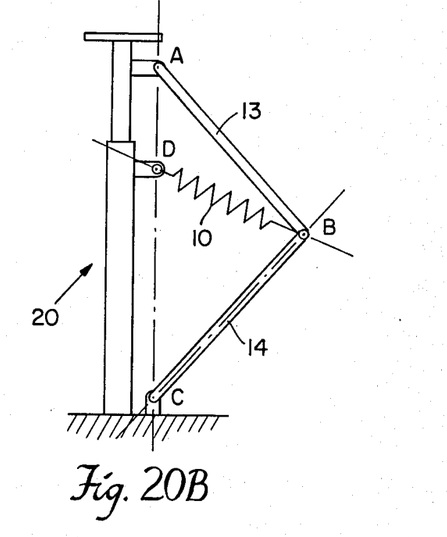

Summarizing important aspects of the invention with reference to FIGS. 20A and 20B, the invention may comprise three moving parts; two link arms 13, 14 and a spring 10. Assuming configuration with a standard slide tube 20 and vertical orientation, with arms 13, 14 joined by a pin connection at point B, one end of the link arm pair is pivotally connected to a base reference point C, while the other end is pivotally connected to the movable upper portion of the slide at point A. Having now defined three pin connections and a vertical axis passing through upper and lower pivot points A and C, point A is constrained, (by the slide tube assembly), to motion along that vertical axis AC. One end of the spring 10 is pivotally connected anywhere along an axis passing through the lower link arm CB. (In FIGS. 20A and 20B, the spring 10 is connected for simplicity to the joint between upper and lower link arms at point B.) The inboard end of the spring 10 is then pivotally connected to any fixed point D along the vertical axis AC.

A simple relationship between the constants W (load or weight to be counterbalanced), R (the spring rate of the spring chosen), and L (the height of the fixed end of the spring at point D above point C), can be shown to exist independent of position and valid over the desired range of travel. The controlling equation is: $R = (2W)/L$. With R a constant for a given spring, it can be seen that height L can be adjusted to accommodate various values of weight W. If no change in load W is anticipated, then no adjustment of height L will be required to counterbalance load W.

Figure 21A:
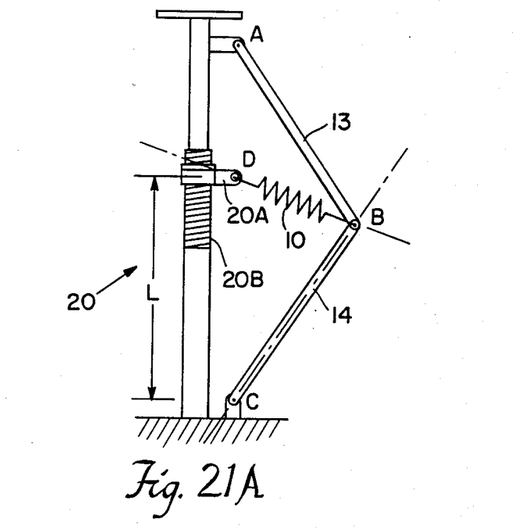
FIG. 21A shows the mechanism of FIGS. 20A and 20B with typical means for adjusting the height L.
Figure 21B:
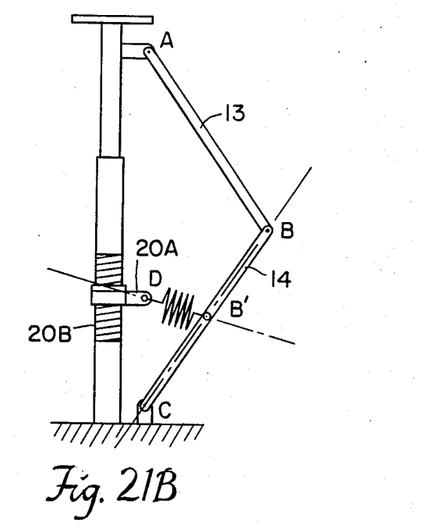
FIG. 21B shows the mechanism of FIG. 21A with a more compact spring installation with the outboard end of the spring connected to an intermediate point on the lower link arm.

FIG. 21A shows the mechanism in FIG. 20 with typical means to adjust height L comprising an internally threaded collar 20A seated on a threaded portion of rotatable tube 20B of slide tube assembly 20, while FIG. 21B shows a more compact spring installation achieved by moving the outboard end of the spring 10 to an intermediate position 13 along the lower link arm 14.

Figure 22A:
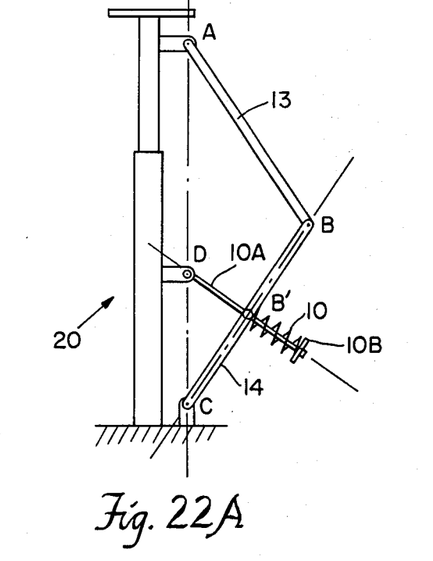
FIGS. 22A, 22B, 22C and 22D show the mechanism of FIGS. 20A and 20B with alternate spring configurations.
Figure 22B:
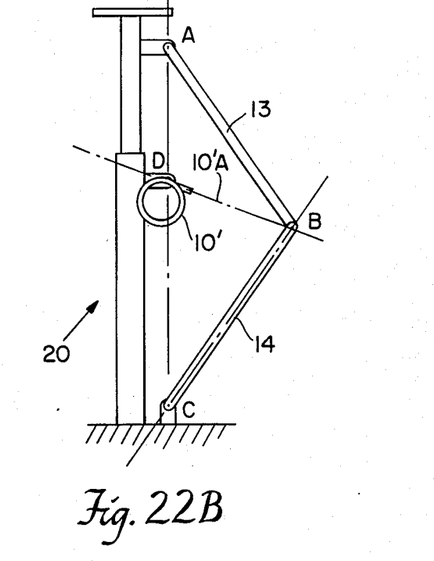

FIGS. 22A, 22B, 22C and 22D show selected alternate spring configurations. FIG. 22A shows spring 10 surrounding a rod 10A extending through a collar diagrammatically represented at point B' through which rod 10A slides between link 14 and end cap 10B of rod 10A. FIG. 22B shows a torsion spring 10' which may be connected by a line 10'A to pivot point B.

Figure 22C:
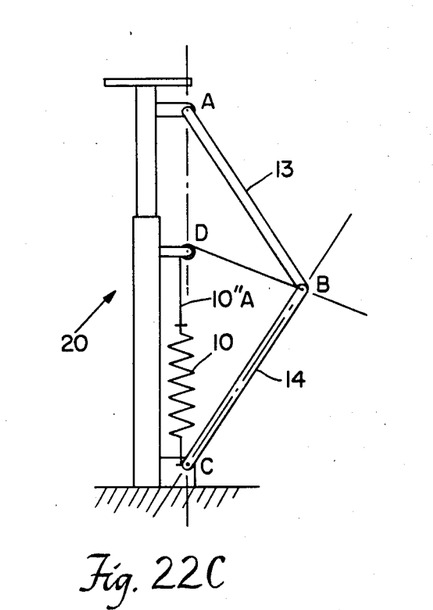
Figure 22D:
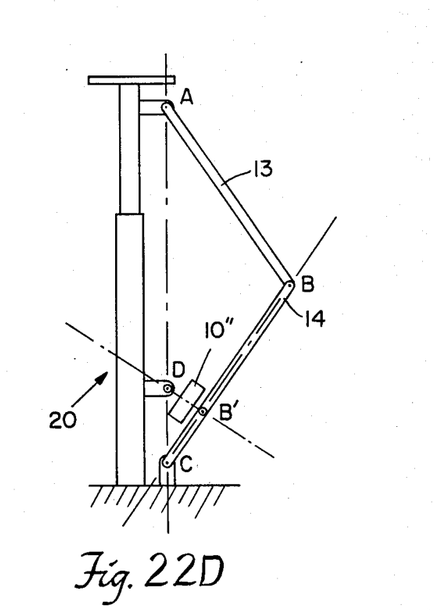

FIG. 22C shows a variation in which spring 10 is connected between pivot point C and a line 10''A that rides over a pulley at point D and is connected to point B. FIG. 22D shows an elastic material 10'' connected between points B' and D.

Figure 23A:
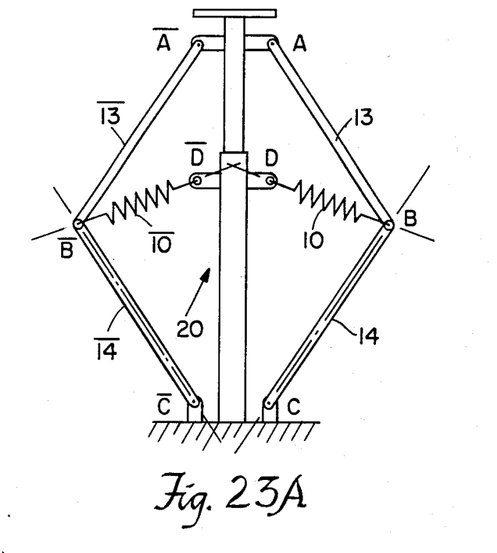
FIGS. 23A and 23B show another form of the invention having multi-sided link arm pair assemblies.
Figure 23B:
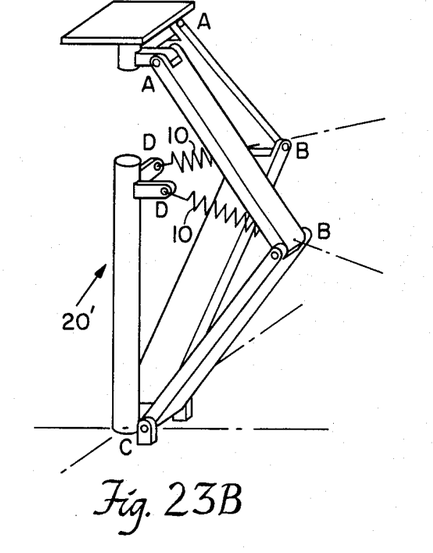

FIGS. 23A and 23B show multi-sided link arm pair assemblies which are inherently very efficient. FIG. 23A shows essentially the mirror image of the assembly of FIGS. 20A and 20B on the left side of slide tube assembly 20 with corresponding elements designated by a bar above the letter or number designation. FIG. 23B shows an assembly with links on the same side of a fixed tube 20' that is free of a separate slide tube or bearing system to control vertical travel.

Figure 24:
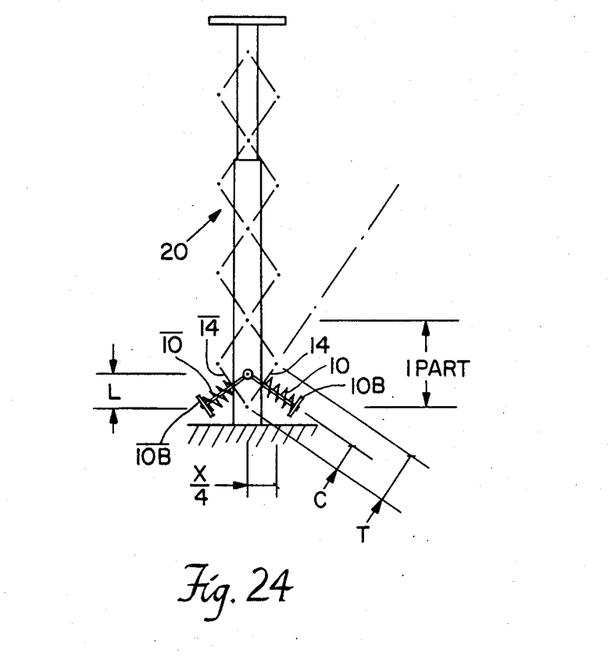
FIG. 24 shows a generalized multi-part system.

Referring to FIG. 24, there is shown a multi-part system using a pantagraphic linkage represented by dash dot lines using multiple spring arrangements substantially of the type shown in FIG. 22A with springs 10 and $\overline{10}$ between lowermost links 14 and $\overline{14}$ and caps 10B and $\overline{10B}$. This embodiment demonstrates the ability of the invention to minimize lateral clearance dimensions and the inherent flexibility of the invention. For a given angle of link 14, with a pantagraph linkage as shown in FIG. 24, the required horizontal clearance is reduced by N when compared with the position of link 14 in the embodiment of FIGS. 20A and 20B where N is the number of parallelograms embraced by the pantagraphic linkage. Thus, with four parallelograms as shown in FIG. 24, the horizontal clearance required for a given angle of link 14 is ¼ that of the embodiment of FIGS. 20A and 20B. FIGS. 23A and 23B show multi-sided link arm pair assemblies, which are inherently very efficient, and can be oriented to eliminate the need for a separate slide tube or bearing system to control vertical travel.

Figure 25:
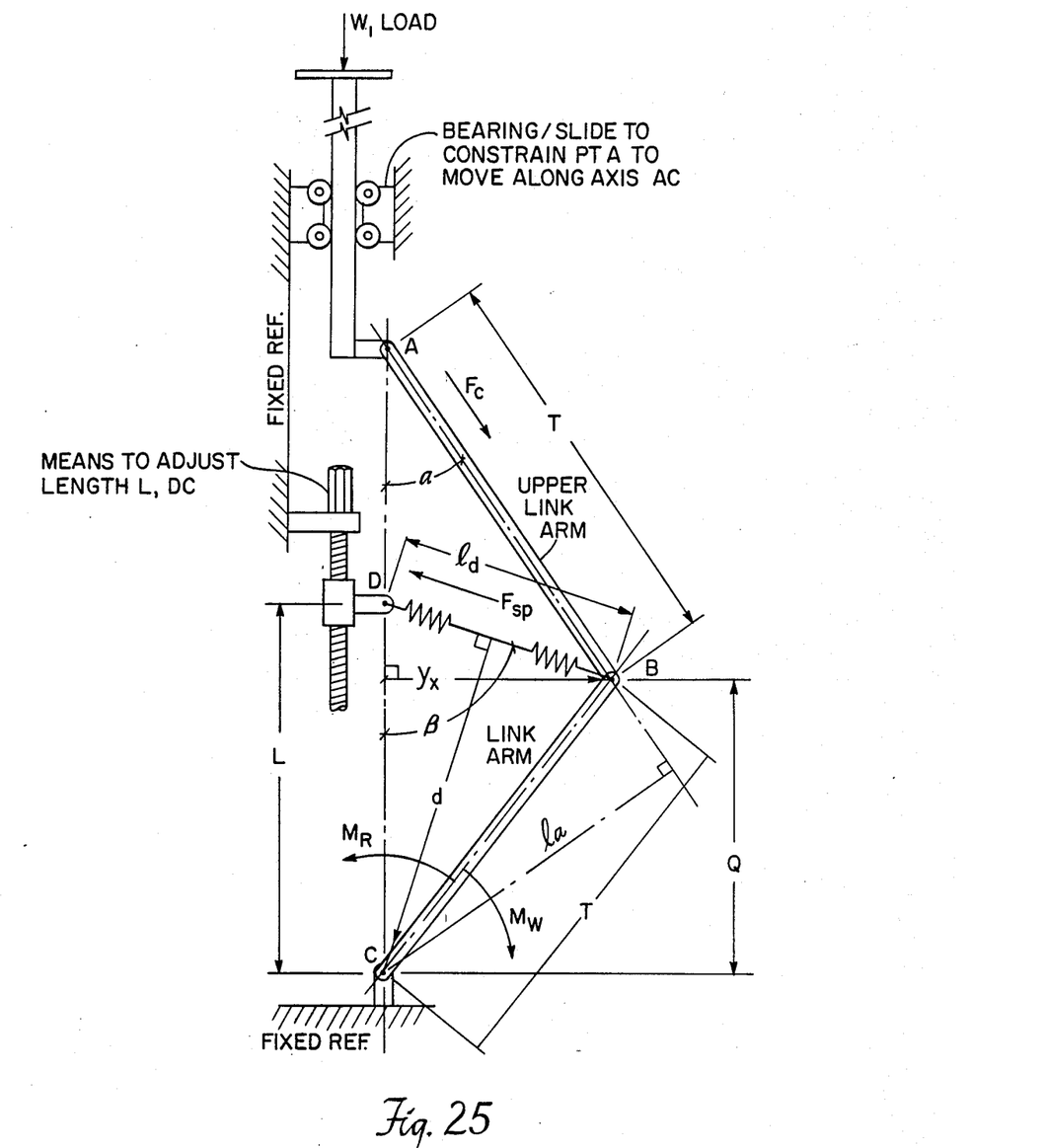
FIG. 25 shows a simplified model of the invention especially suitable for analysis.

FIG. 25 shows a simplified model of the invention suitable for analysis. Terms used are defined below. The effect of friction has not been considered here, but has been found to be negligible and can be functionally removed from consideration by utilizing opposing link arm assemblies, (as in FIG. 23A, for example).

$\alpha$ = Angle, link arm axis to vertical axis $\overline{AC}$
$\beta$ = Angle, spring axis $\overline{DB}$ to vertical axis $\overline{AC}$
T = Length of link arms $\overline{AB}$, $\overline{CB}$
Q = Vertical height pt. B to pt. C
L = Vertical distance $\overline{CD}$
$l_d$ = Length along the spring axis $\overline{DB}$
$y_x$ = Perpendicular distance from vertical $\overline{AC}$ to pt. B
d = Perpendicular distance from $l_d$ to pt. C
$l_a$ = Perpendicular distance from $\overline{AB}$ to pt. C $F_c$ = Compressive force component from W along $\overline{AB}$
$F_{sp}$ = Force along $\overline{DB}$ from spring or elastic material obeying Hooke's law
$M_W$ = Moment about pt. C from $F_c$
$M_R$ = Moment about pt. C from $F_{sp}$
R = Spring rate (lb.in.)
(Total cumulative rate for any and all springs used.)

Equilibrium is achieved independent of angle $\alpha$, (or of the position of the support column along its range of travel), by requiring the summation of moments about lower pivot point C to be zero. It can be shown that $M_W$, (the moment produced by load component $F_c$, about point C), is 2WT sin $\alpha$, where W is the load to be counterbalanced; T is the link arm length; $\alpha$ is the angle formed by link arms and vertical axis $\overline{AC}$. Correspondingly, $M_R$, (the moment produced by spring force $F_{sp}$, about point C), is RLT sin $\alpha$, where R is the cumulative spring rate of any and all springs used (typically in lb./in.), and L is the adjustable height $\overline{CD}$.

Then, requiring $M_W = M_R$, $$2WT \sin \alpha = RLT \sin \alpha$$

$$2W = RL$$

$$R = (2W)/L$$

This equation is valid for all angles $\alpha$ and corresponding positions over a maximum stroke of 4T, except instantaneously at angles $\alpha$ of 90° and multiples thereof. A stroke of up to 2T is then available for this application, with the expectation that required working extensions on the order of $\frac{1}{2}$T should be more than adequate.

With R a constant for a given spring, the equation is maintained for alternate loads W by proportionally adjusting height L. While an extension spring with no initial tension is modeled, any linear rate elastic material or device may be utilized, including, but not limited to, compression springs, torsion springs, synthetic elastics, and hydraulic or pneumatic cylinders. An extension spring with initial tension equal to R·(minimum $l_d$), or R·(solid height), may be utilized to advantage.

Referring again to FIG. 24, wherein a multipart mechanism is shown with spring connection at an intermediate point along lower link arms, the expression becomes;

$$R = (2W)/L) \cdot (T/c) \cdot (\# \text{ parts})$$

where c is the length along lower link arm from point C to the outboard spring attachment point, and 1 part is defined as having a maximum extended height of 2T.

There have been described novel apparatus and techniques for advantageously counterbalancing over a wide range of travel while allowing adjustment to suit a wide range of weights and requiring negligible force or energy to achieve such adjustment. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Counterbalancing apparatus comprising,
   a weight W to be counterbalanced movable along a first axis,
   means for supporting said weight W to be counterbalanced and movable along said axis,
   at least one upper lever means for pivotal connection to said means for supporting at its upper end,
   at least one lower lever means for pivotal connection at its lower end to an intermediate pivot point and pivotally connected at its upper end to the lower end of said upper lever means,
   spring means for providing a counterbalancing force,
   and means for coupling said spring means to an inside pivotal connection such that a force from said spring means lies along a second axis through said lower lever means in a direction intersecting said first axis,
   the spring rate $R_T$ of said spring means, the weight W to be supported on said means for supporting and the distance L between said inside pivotal connection and said lower level means lower end being related by the equation $R_T = 2W/L$,
   whereby said counterbalancing apparatus comprises a self-contained counterbalance mechanism that, neglecting minimal effects of friction, manufacturing inaccuracies and strains, substantially exactly counterbalances said weight W over the linear range of travel of said weight along said first axis.

2. Counterbalancing apparatus in accordance with claim 1 wherein said means for coupling said spring to said pivotal connection comprises a pulley slidable along said vertical axis.
   a spring fixed at one end,
   and a cable connected between the other end of said spring and the intermediate pivotal connection between the upper and lower lever means.

3. Counterbalancing apparatus in accordance with claim 1 and further comprising,
   means for adjustably positioning said spring means.

4. Counterbalancing apparatus in accordance with claim 3 wherein said means for adjustably positioning said spring comprises an auxiliary mechanism having a parallelogram linkage with a second spring interconnecting opposed points of said linkage at substantially the same horizontal height,
   said second spring having a spring rate substantially $R_T/2$.

5. Counterbalancing apparatus in accordance with claim 1 and further comprising,
   means for adjusting said height L.

6. Counterbalancing apparatus in accordance with claim 5 wherein said means for adjusting said height L comprises,
   a threaded shaft,
   and an internally threaded annular collar carrying said pivotal connection mounted on said threaded shaft so that rotation of said shaft changes the height of said threaded collar.

7. Counterbalancing apparatus in accordance with claim 1 wherein said spring means is between said pivotal connection and a pivot point on a pivot axis perpendicular to both an axis coincident with said lower lever means and a plane including said upper lever means and said lower lever means.

8. Counterbalancing apparatus in accordance with claim 7 wherein said pivot point coincides with said intermediate pivot point.

9. Counterbalancing apparatus in accordance with claim 7 and further comprising, means for adjusting said height L.

10. Counterbalancing apparatus in accordance with claim 9 wherein said means for adjusting said height L comprises,
   a threaded shaft,
   and an internally threaded annular collar carrying said pivotal connection mounted on said threaded shaft so that rotation of said shaft changes the height of said threaded collar.

11. Counterbalancing apparatus in accordance with claim 1 wherein said spring means surrounds a rod having one end comprising said pivotal connection and the other end having a cap thereon and extending beyond said lower lever arm with an intermediate point pivotally connected to said lower lever arm means,
   said spring means being located between said lower lever arm means and said cap.

12. Counterbalancing apparatus in accordance with claim 1 wherein said spring means comprises a torsion spring at said pivotal connection.

13. Counterbalancing apparatus in accordance with claim 1 wherein said spring means is located between said pivotal connection and the lower end of said lower lever means and further comprising,
   a pulley comprising said pivotal connection,
   and a line interconnecting said spring means and a pivot point located along an axis embraced by said lower lever arm means.

14. Counterbalancing apparatus in accordance with claim 1 wherein said spring means is located between said pivotal connection and a pivot point on said lower lever arm means.

15. Counterbalancing apparatus in accordance with claim 1 and further comprising,
   at least a second of said upper lever means,
   at least a second of said lower lever arm means,
   and at least a second of said pivotal connections.

16. Counterbalancing apparatus in accordance with claim 15 wherein said upper lever means, said lower lever means and said pivotal connections are symmetrically disposed about said axis.

17. Counterbalancing apparatus in accordance with claim 15 wherein one set of said upper lever means, lower lever means and pivotal connection embraces a vertical plane substantially orthogonal to a vertical plane embraced by a second set of said upper lever means, said lower lever means and said pivotal connection.

18. Counterbalancing apparatus in accordance with claim and further comprising a pantographic linkage for coupling said upper lever means to said means for supporting.

19. Counterbalancing apparatus comprising,
   a source of a force source providing a force W to be counterbalanced movable along a first axis,
   means for supporting said force source providing said force W to be counterbalanced and movable along said first axis,
   at least one first lever means for pivotal connection to said means for supporting at a first end of said first lever means,
   at least one second lever means for pivotal connection at a first end of said second lever means to an intermediate pivot point and pivotally connected at a second point of said second lever means to a second point of said first lever means,
   spring means for providing a counterbalancing force,
   and means for coupling said spring means to an inside pivotal connection such that a force from said spring means lies along a second axis through said second lever means in a direction intersecting said first axis,
   the spring rate $R_T$ of said spring means, the force W and the distance L between said inside pivotal connection and said second lever means first end being related by the equation $R_T = 2W/L$,
   whereby said counterbalancing apparatus comprises a self-contained counterbalance mechanism that, neglecting minimal effects of friction, manufacturing inaccuracies and strains, substantially exactly counterbalances said force W over the linear range of travel of said force source along said first axis.

* * * * *